US008901776B2

(12) United States Patent
Urano

(10) Patent No.: US 8,901,776 B2
(45) Date of Patent: Dec. 2, 2014

(54) WIRELESS POWER FEEDER, WIRELESS POWER RECEIVER, AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 775 days.

(21) Appl. No.: 13/088,840

(22) Filed: Apr. 18, 2011

(65) Prior Publication Data
US 2011/0198940 A1 Aug. 18, 2011

(51) Int. Cl.
*H01F 38/14* (2006.01)
*H04B 5/00* (2006.01)
*H02J 5/00* (2006.01)

(52) U.S. Cl.
CPC ............... *H01F 38/14* (2013.01); *H04B 5/0037* (2013.01); *H04B 5/0093* (2013.01); *H02J 5/005* (2013.01)
USPC .......................................... 307/104; 343/767

(58) Field of Classification Search
CPC ........ H01Q 1/2283; H02J 17/00; H02J 5/005; H04B 5/0037; H01F 38/14
USPC .......................................................... 343/895
See application file for complete search history.

(56) References Cited

U.S. PATENT DOCUMENTS

| | | | |
|---|---|---|---|
| 5,815,122 A * | 9/1998 | Nurnberger et al. | 343/767 |
| 5,831,348 A * | 11/1998 | Nishizawa | 307/104 |
| 7,741,734 B2 | 6/2010 | Joannopoulos et al. | |
| 8,378,473 B2 * | 2/2013 | Yamazaki et al. | 257/679 |
| 2007/0222542 A1 | 9/2007 | Joannopoulos et al. | |
| 2008/0042917 A1 * | 2/2008 | Seki et al. | 343/767 |
| 2008/0211320 A1 | 9/2008 | Cook et al. | |
| 2008/0278264 A1 | 11/2008 | Karalis et al. | |
| 2009/0015075 A1 | 1/2009 | Cook et al. | |
| 2009/0045772 A1 | 2/2009 | Cook et al. | |
| 2009/0051224 A1 | 2/2009 | Cook et al. | |
| 2009/0058189 A1 | 3/2009 | Cook et al. | |
| 2009/0072627 A1 | 3/2009 | Cook et al. | |
| 2009/0072628 A1 | 3/2009 | Cook et al. | |
| 2009/0072629 A1 | 3/2009 | Cook et al. | |
| 2009/0079268 A1 | 3/2009 | Cook et al. | |
| 2009/0102292 A1 | 4/2009 | Cook et al. | |
| 2009/0134712 A1 | 5/2009 | Cook et al. | |
| 2009/0167449 A1 | 7/2009 | Cook et al. | |
| 2009/0179502 A1 | 7/2009 | Cook et al. | |
| 2009/0195332 A1 | 8/2009 | Joannopoulos et al. | |
| 2009/0195333 A1 | 8/2009 | Joannopoulos et al. | |
| 2009/0212636 A1 | 8/2009 | Cook et al. | |

(Continued)

FOREIGN PATENT DOCUMENTS

JP 09-326736 A 12/1997
JP 2002-231534 A 8/2002

(Continued)

*Primary Examiner* — Jared Fureman
*Assistant Examiner* — Joel Barnett
(74) *Attorney, Agent, or Firm* — McDermott Will & Emery

(57) ABSTRACT

Power is fed from a feeding coil to a receiving coil using magnetic resonance. The feeding coil is wound in a first layer substrate 144 of a multilayer substrate 116 with a space provided between the coil conductor thereof and further wound in a second later substrate 146 with a space provided between the coil conductor thereof. The feeding coil is wound such that a coil conductor 106a in the first layer and a coil conductive wire 106b in the second layer do not overlap each other as viewed in the axial direction (z-axis direction).

18 Claims, 15 Drawing Sheets

(56) References Cited

U.S. PATENT DOCUMENTS

| | | |
|---|---|---|
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0243397 A1* | 10/2009 | Cook et al. .................... 307/104 |
| 2009/0267709 A1 | 10/2009 | Joannopoulos et al. |
| 2009/0267710 A1 | 10/2009 | Joannopoulos et al. |
| 2009/0273242 A1 | 11/2009 | Cook |
| 2009/0284083 A1 | 11/2009 | Karalis et al. |
| 2010/0038970 A1 | 2/2010 | Cook et al. |
| 2010/0052431 A1* | 3/2010 | Mita ............................ 307/104 |
| 2010/0052811 A1* | 3/2010 | Smith et al. .................... 333/33 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0182211 A1* | 7/2010 | Peters .......................... 343/730 |

FOREIGN PATENT DOCUMENTS

| | | |
|---|---|---|
| JP | 2006-230032 | 8/2006 |
| JP | 2008-172872 | 7/2008 |
| WO | WO 2006/022365 A1 | 3/2006 |
| WO | 2009/009559 A1 | 1/2009 |

* cited by examiner

WIRELESS POWER FEEDER, WIRELESS POWER RECEIVER, AND WIRELESS POWER TRANSMISSION SYSTEM

BACKGROUND OF THE INVENTION

1. Field of the Invention

The present invention relates to structures of coils used in wireless AC power feeding/receiving.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load connected in series to the loading coil. By utilizing the magnetic field resonance phenomenon, high power transmission efficiency can be achieved even if the feeding coil and receiving coil are largely spaced from each other.

[Patent Document 1] U.S. Pat. Appln. Publication No. 2008-0278264

[Patent Document 2] Jpn. Pat. Appln. Laid-Open Publication No. 2006-230032

[Patent Document 3] International Publication Pamphlet No. WO2006-022365

[Patent Document 4] U.S. Pat. Appln. Publication No. 2009-0072629

[Patent Document 5] U.S. Pat. Appln. Publication No. 2009-0015075

[Patent Document 6] Jpn. Pat. Appln. Laid-Open Publication No. 2008-172872

A receiving coil is connected to a capacitor to constitute an LC resonance circuit. A feeding coil is connected to another capacitor to constitute an LC resonance circuit. When the resonance frequencies of these LC resonance circuits coincide with each other, power transmission efficiency becomes maximum.

Since a frequency band not higher than 135 kHz is less constrained by Radio Act, there may be a case where it is preferable to set a resonance frequency at a low frequency band. In order to reduce the resonance frequency, it is only necessary to increase the inductance of a coil. To this end, it is only necessary to increase the number of windings of the coil. However, this increases the size of the coil. Further, when the coil is wound closely, the stray capacitance between coil conductors is increased, which poses a problem that resonance characteristics are degraded.

The present invention has been achieved based on the above issue, and a main object thereof is to increase the number of windings of a coil used in wireless power feeding of a magnetic field resonance type while suppressing the size of the coil.

SUMMARY

A wireless power feeder according to the present invention is a device that feeds power from a feeding coil to a receiving coil by wireless using a magnetic field resonance phenomenon between the feeding coil and receiving coil. The wireless power feeder includes: a feeding coil circuit that includes the feeding coil; and a power supply circuit that supplies AC power to the feeding coil. The feeding coil is wound in a first layer and a second layer with a space between coil conductors ensured, and the coil conductor in the first layer and coil conductor in the second layer are alternately arranged as viewed in the axial direction of the feeding coil.

By winding the feeding coil in a multilayer structure, it is possible to increase the number of windings while suppressing the plane size of the feeding coil. Further, by providing a space between coil conductors, it is possible to suppress the stray capacitance. Further, by alternately arranging the coil conductor in a first layer and in a second layer in parallel, it is possible to ensure a distance between the coil conductors in the first layer and second layer. With such a structure, the stray capacitance between the coil conductor in a first layer and coil conductor in a second layer can also be suppressed.

The feeding coil may be wound on a multilayer substrate having the first and second layers. Both or one of the first and second layers of the multilayer substrate may have a groove for accommodating the coil conductor of the feeding coil within the substrate. Since the feeding coil can be accommodated within the multilayer substrate, the winding structure of the feeding coil can be easily and stably maintained. Further, external influence on the feeding coil can be easily eliminated.

A hollow portion may be formed in the center portion of the multilayer substrate and a cut portion may be formed in a part of the hollow portion. The coil conductor in the first layer and coil conductor in the second layer may connect with each other through the cut portion. The space may be made larger than the conductor diameter of the feeding coil, whereby the stray capacitance between the coil conductors can further be suppressed.

The wireless power feeder may further include an exciting circuit including an exciting coil magnetically coupled to the feeding coil. The exciting circuit may supply the AC power supplied from the power supply circuit from the exciting coil to feeding coil. The exciting coil may be wound inside the feeding coil.

The power supply circuit may cause the feeding coil to which no capacitor is connected in series or in parallel, to feed the AC power to the receiving coil. Here, the resonance of the feeding coil may not be essential for the wireless power feeding, but this does not mean that even an accidental resonance of the feeding coil with some circuit elements is eliminated. A configuration may be possible in which the feeding coil does not form, together with circuit elements on the power feeding side, a resonance circuit having a resonance point corresponding to the resonance frequency of the receiving coil. Further, a configuration may be possible in which no capacitor is connected in series or in parallel to the feeding coil.

The feeding coil circuit may be constructed as a circuit that resonates at the resonance frequency of the receiving coil.

A wireless power receiver according to the present invention is a device that receives, at a receiving coil, AC power fed from a feeding coil by wireless using a magnetic field resonance phenomenon between the feeding coil and receiving coil. The wireless power receiver includes a receiving coil circuit and a loading circuit. The receiving coil circuit includes a receiving coil and a capacitor. The loading circuit includes a loading coil that is magnetically coupled to the receiving coil to receive the AC power from the receiving coil and a load to which the AC power is supplied from the loading coil. The receiving coil is wound in a first layer and a second layer with a space between coil conductors ensured, and the coil conductor in the first layer and coil conductor in the second layer are alternately arranged as viewed in the axial direction of the receiving coil.

By winding the receiving coil in a multi layer structure, it is possible to increase the number of windings while suppressing the plane size of the receiving coil. Further, by providing a space between coil conductors, it is possible to suppress the stray capacitance. Further, by alternately arranging the coil conductor in a first layer and in a second layer in parallel, it is possible to ensure a distance between the coil conductors in the first layer and second layer. With such a structure, the stray capacitance between the coil conductor in a first layer and coil conductor in a second layer can also be suppressed.

The receiving coil may be wound on a multilayer substrate having the first and second layers. Both or one of the first and second layers of the multilayer substrate may have a groove for accommodating the coil conductor of the receiving coil within the substrate. A hollow portion may be formed in the center portion of the multilayer substrate and a cut portion may be formed in a part of the hollow portion. The coil conductor in the first layer and coil conductor in the second layer may connect with each other through a cut portion.

The receiving coil circuit may be constructed as a circuit that resonates at the resonance frequency of the feeding coil circuit.

A wireless power transmission system according to the present invention is a system for feeding power from a feeding coil to a receiving coil by wireless using a magnetic field resonance phenomenon between the feeding coil and receiving coil. The system includes: a power supply circuit that supplies AC power to the feeding coil; a feeding coil circuit that includes the feeding coil; a receiving coil circuit that includes a receiving coil and a capacitor; and a loading circuit that includes a loading coil that is magnetically coupled to the receiving coil to receive the AC power from the receiving coil and a load to which the AC power is supplied from the loading coil. Both or one of the feeding coil and receiving coil are wound in a first layer and in a second layer with a space between coil conductors ensured, and the coil conductor in the first layer and coil conductor in the second layer are alternately arranged as viewed in the power feeding direction.

It is to be noted that any arbitrary combination of the above-described structural components and expressions changed between a method, an apparatus, a system, etc. are all effective as and encompassed by the present embodiments.

According to the present invention, it is possible to easily increase the number of windings of a coil used in wireless power feeding of a magnetic field resonance type while suppressing the size of the coil.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be described below with reference to the accompanying drawings.

[First Embodiment]

Figure 1:
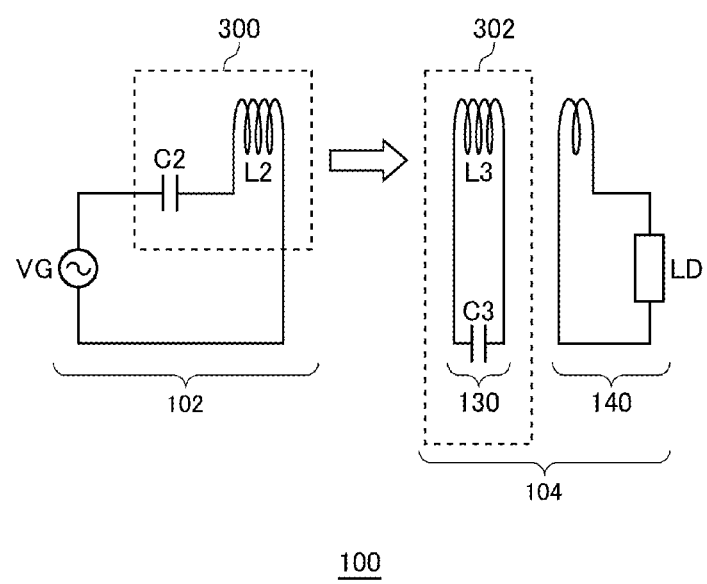
FIG. 1 is a view illustrating operation principle of a wireless power transmission system according to a first embodiment.

FIG. 1 is a view illustrating operation principle of a wireless power transmission system 100 according to the first embodiment. The wireless power transmission system 100 in the first embodiment includes a wireless power feeder 102 and a wireless power receiver 104. The wireless power feeder 102 includes a power feeding LC resonance circuit 300. The wireless power receiver 104 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, feeding coil L2, capacitor C3, and receiving coil L3 are set such that the resonance frequencies of the feeding LC resonance circuit 300 and receiving LC resonance circuit 302 coincide with each other in a state where the feeding coil L2 and receiving coil L3 are disposed away from each other far enough to ignore the magnetic field coupling therebetween. This common resonance frequency is assumed to be fr0.

In a state where the feeding coil L2 and receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 102 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the feeding coil L2 generates an AC magnetic field of the resonance frequency fr1. The power receiving LC resonance circuit 302 constituting a part of the new resonance circuit also resonates by receiving the AC magnetic field. When the power feeding LC resonance circuit 300 and power receiving LC resonance circuit 302 resonate at the same resonance frequency fr1, wireless power feeding from the feeding coil L2 to receiving coil L3 is performed with the maximum power transmission efficiency. Received power is taken from a load LD of the wireless power receiver 104 as output power. Note that the new resonance circuit can resonate not only at the resonance point 1 (resonance frequency fr1) but also at a resonance point 2 (resonance frequency fr2).

Although FIG. 1 illustrates a configuration in which the wireless power feeder 102 does not include an exciting coil L1, the basic operation principle of the wireless power feeder 102 is the same as in the case where the wireless power feeder 102 includes the exciting coil L1. A configuration in which the wireless power feeder 102 does not include the exciting coil L1 will be described later using FIG. 13 and the like.

Figure 2:
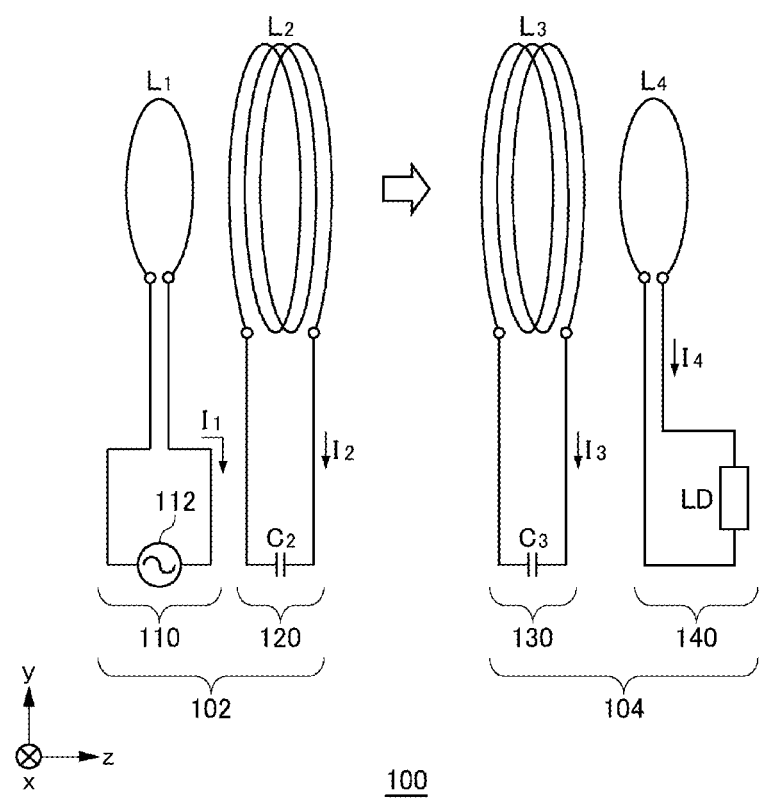
FIG. 2 is a system configuration view of the wireless power transmission system according to the first embodiment.

FIG. 2 is a system configuration view of the wireless power transmission system 100 in the first embodiment. The wireless power transmission system 100 includes a wireless power feeder 102 on the power feeding side and a wireless power receiver 104 on the power receiving side. The wireless power feeder 102 includes an exciting circuit 110 and a feeding coil circuit 120. The wireless power receiver 104 includes a receiving coil circuit 130 and a loading circuit 140.

A distance of about 0.2 m to 1.0 m is provided between the feeding coil L2 included in the feeding coil circuit 120 and receiving coil L3 included in the receiving coil circuit 130. The wireless power transmission system 100 mainly aims to feed power from the feeding coil L2 to the receiving coil L3 by wireless. The wireless power transmission system 100 according to the present embodiment is assumed to operate at a resonance frequency of 100 kHz or less. In the present embodiment, a resonance frequency fr1 is set to 44.5 kHz. Note that the wireless power transmission system according to the present embodiment can operate in a high-frequency band such as ISM (Industry-Science-Medical) frequency band.

Hereinafter, z-axis is set in the direction from the feeding coil L2 to receiving coil L3. Further, x-axis and y-axis crossing z-axis at right angles are set as illustrated in FIG. 2.

The exciting circuit 110 is a circuit in which an exciting coil L1 and an AC power supply 112 are connected in series. The exciting coil L1 receives AC power of the resonance frequency fr1 (=44.5 kHz) from the AC power supply 112. The number of windings of the exciting coil L1 is 1, diameter of a conductor thereof is 5 mm, and shape of the exciting coil L1 itself is a square of 210 mm×210 mm. In FIG. 2, the exciting coil L1 is represented by a circle for descriptive purpose. Other coils are also represented by circles for the same reason. All the coils illustrated in FIG. 2 are made of copper. As the coil conductor, a Litz wire obtained by twisting 252 wires each having a diameter of 0.08 mm is adopted in consideration of the skin effect which can be obvious in a high-frequency band.

The feeding coil circuit 120 is a circuit in which the feeding coil L2 and capacitor C2 are connected in series. The exciting coil L1 and feeding coil L2 face each other. The distance between the exciting coil L1 and feeding coil L2 is as comparatively small as 10 mm or less. Thus, the exciting coil L1 and feeding coil L2 are electromagnetically strongly coupled to each other. The number of windings of the feeding coil L2 is 15, diameter of a conductor thereof is 5 mm, and shape of the feeding coil L2 itself is a square of 280 mm×280 mm. When AC current I1 is made to flow in the exciting coil L1, an electromotive force occurs in the feeding coil L2 according to the principle of electromagnetic induction to cause AC current I2 to flow in the feeding coil circuit 120. The AC current I2 is considerably larger than the AC current I1. The values of the feeding coil L2 and capacitor C2 are set such that the resonance frequency fr1 is 44.5 kHz.

The receiving coil circuit 130 is a circuit in which the receiving coil L3 and capacitor C3 are connected in series. The feeding coil L2 and receiving coil L3 face each other. The distance between the feeding coil L2 and receiving coil L3 is as comparatively large as about 0.2 m to 1.0 m. The number of winding of the receiving coil L3 is 15, diameter of a conductor thereof is 5 mm, and shape of the receiving coil L3 itself is a square of 280 mm×280 mm. The values of the receiving coil L3 and capacitor C3 are set such that the resonance frequency fr1 is 44.5 kHz. When the feeding coil circuit 120 generates a magnetic field at the resonance frequency fr1 (=44.5 kHz), the feeding coil circuit 120 and receiving coil circuit 130 magnetically resonate, causing large AC current I3 to flow in the receiving coil circuit 130.

The loading circuit 140 is a circuit in which a loading coil L4 and the load LD are connected in series. The receiving coil L3 and loading coil L4 are brought close to each other to such an extent that they substantially overlap each other. Thus, the receiving coil L3 and loading coil L4 are electromagnetically strongly coupled to each other. The number of windings of the loading coil L4 is 1, diameter of a conductor thereof is 5 mm, and shape of the loading coil L4 itself is a square of 300 mm×300 mm. When the AC current I3 is made to flow in the receiving coil L3, an electromotive force occurs in the loading coil L4 to cause AC current I4 to flow in the loading circuit 140. Thus, the AC power supplied from the AC power supply 112 is fed by the exciting circuit 110 and feeding coil circuit 120 to the receiving coil circuit 130 and loading circuit 140. After that, the AC power is taken from the load LD.

When the load LD is connected in series to the receiving coil circuit 130, the Q-value of the receiving coil circuit 130 is degraded. Therefore, the receiving coil circuit 130 for power reception and loading circuit 140 for power extraction are separated from each other. In order to enhance power transmission efficiency, the center lines of the exciting coil L1, feeding coil L2, receiving coil L3, and loading coil L4 are preferably made to coincide with one another.

In order to set the resonance frequency fr1 in the low-frequency band, it is only necessary to increase the inductance of the feeding coil L2 and receiving coil L3. However, in order to increase the inductance, the number of windings of the coil needs to be increased, with the result that the coil size is increased. Thus, in the present embodiment, winding structures of the feeding coil L2 and receiving coil L3 are devised so as to ensure a sufficient number of windings while suppressing an increase in the coil size. Before describing the winding structure of the present embodiment, "close winding" and "spacer winding" and their problems will be described.

Figure 3:
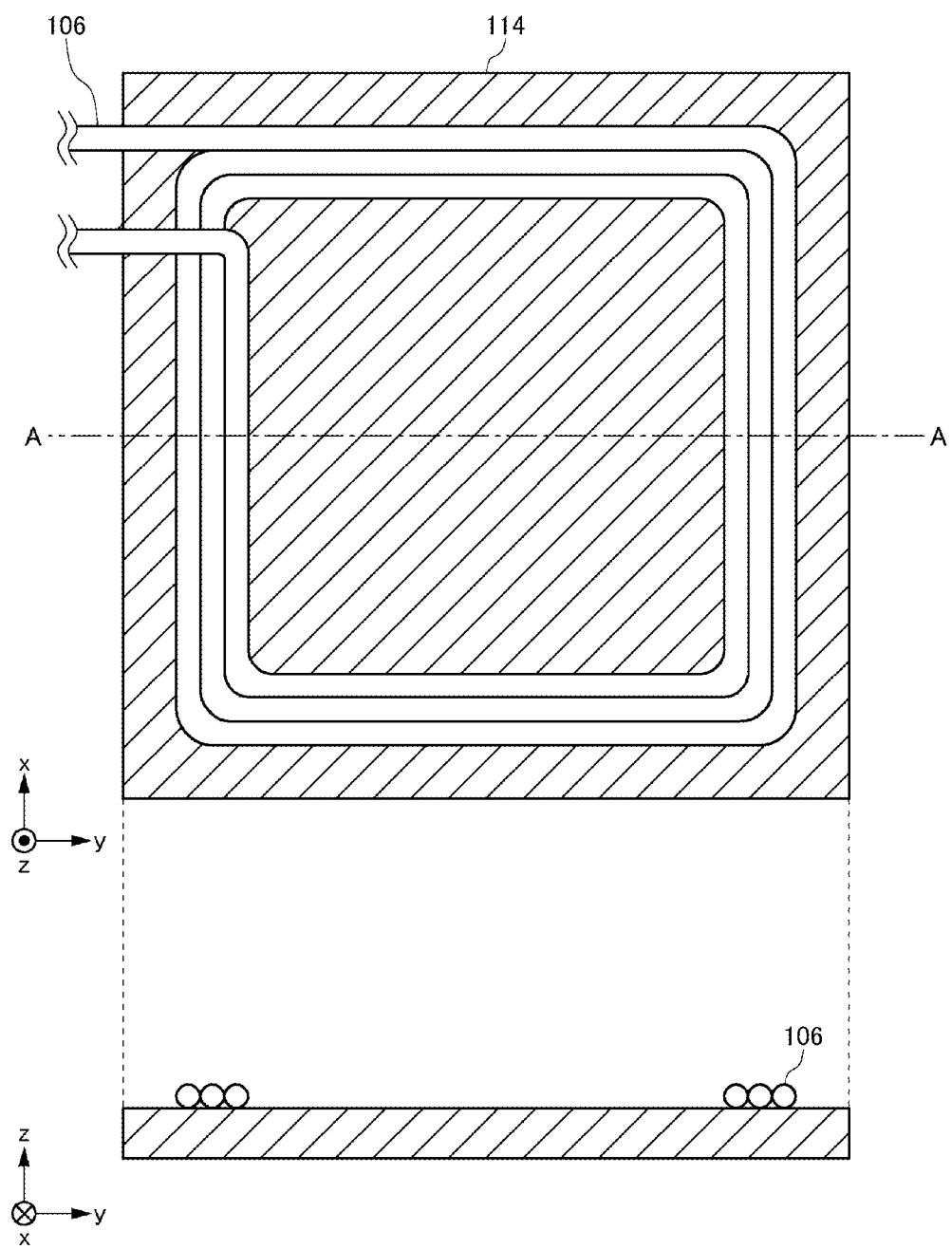
FIG. 3 is a development view schematically illustrating a close winding structure.

FIG. 3 is a development view schematically illustrating the close winding structure. The upper side of FIG. 3 is an xy plane view, and the lower side thereof is a side cross-sectional view (yz plane) taken along A-A line. In FIG. 3, a coil conductor 106 is wound on the xy plane of a substrate 114. The adjacent coil conductors 106 are in close contact with each other. The close winding has an advantage that the number of coil windings can be increased but has a disadvantage that the stray capacitance between the coil conductors 106 is easily increased. In particular, when the resonance frequency fr1 is set at a high frequency band, the skin effect of the coil conductor 106 easily becomes obvious, which increases the influence of the stray capacitance further.

Figure 4:
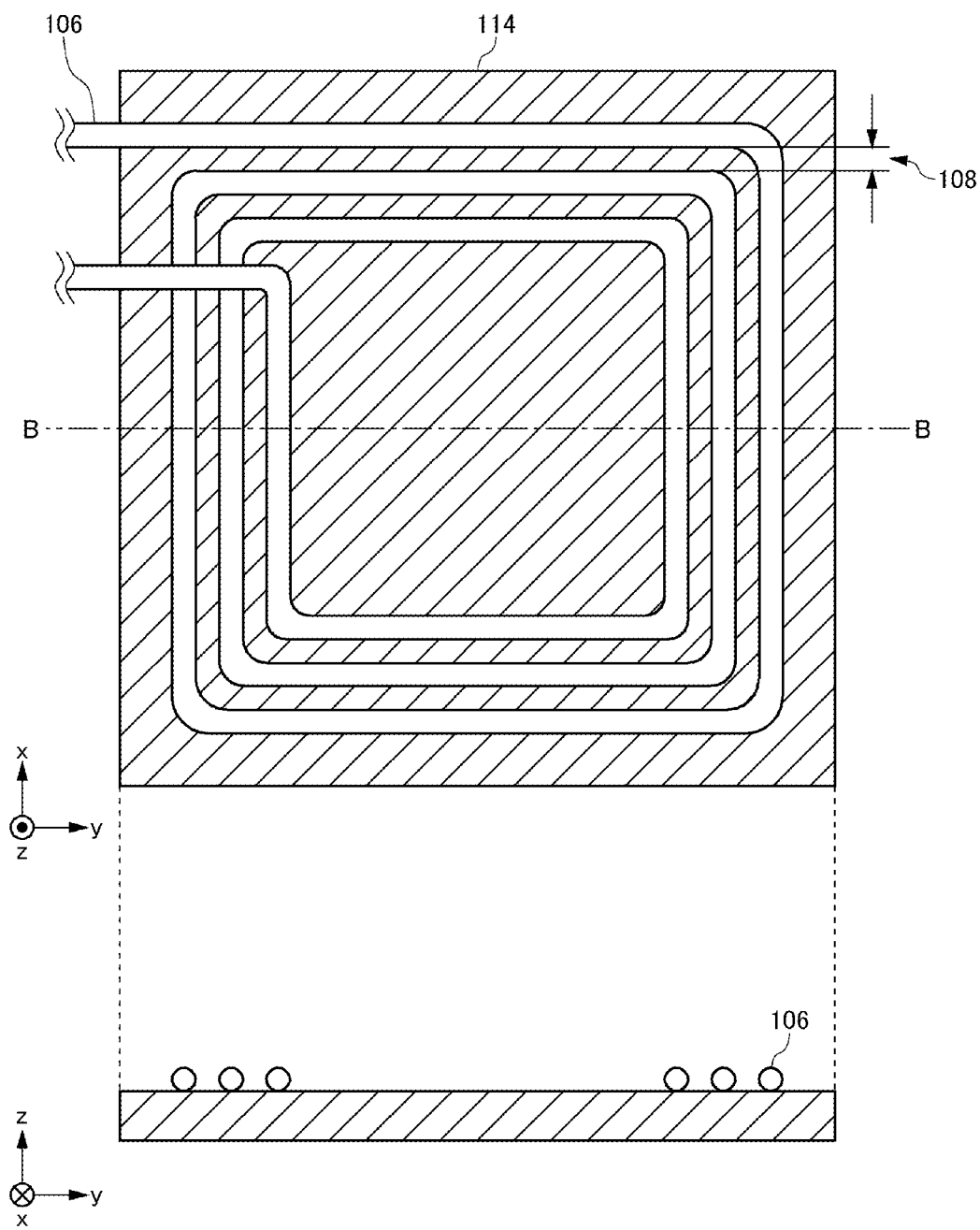
FIG. 4 is a development view schematically illustrating a spacer winding structure.

FIG. 4 is a development view schematically illustrating the spacer winding structure. The upper side of FIG. 4 is an xy plane view, and the lower side thereof is a side cross-sectional view (yz plane) taken along B-B line. In FIG. 4, a coil conductor 106 is also wound on the xy plane of a substrate 114. A space 108 is provided between adjacent coil conductors 106. The spacer winding has an advantage that the stray capacitance between the coil conductor 106 can be reduced but has a disadvantage that the number of coil windings is difficult to increase.

Figure 5:
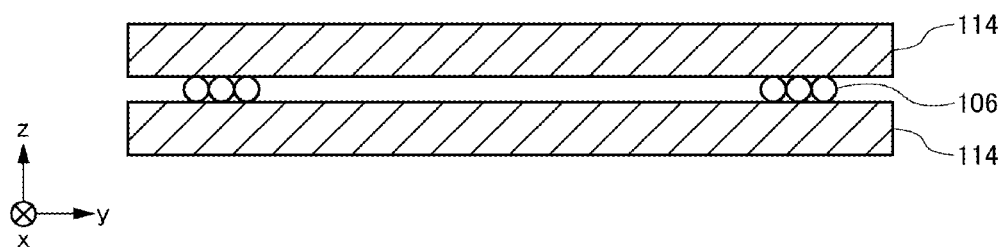
FIG. 5 is a cross-sectional view schematically illustrating a structure of a double-sided substrate type.

FIG. 5 is a cross-sectional view schematically illustrating a structure of a double-sided substrate type. The structure as illustrated in FIGS. 3 and 4 in which the coil conductor 106 is wound on one substrate 114 is referred to as "single-sided substrate type". On the other hand, the structure as illustrated in FIG. 5 in which the coil conductor 106 is sandwiched by two substrates 114 is "double-sided substrate type".

Figure 6:
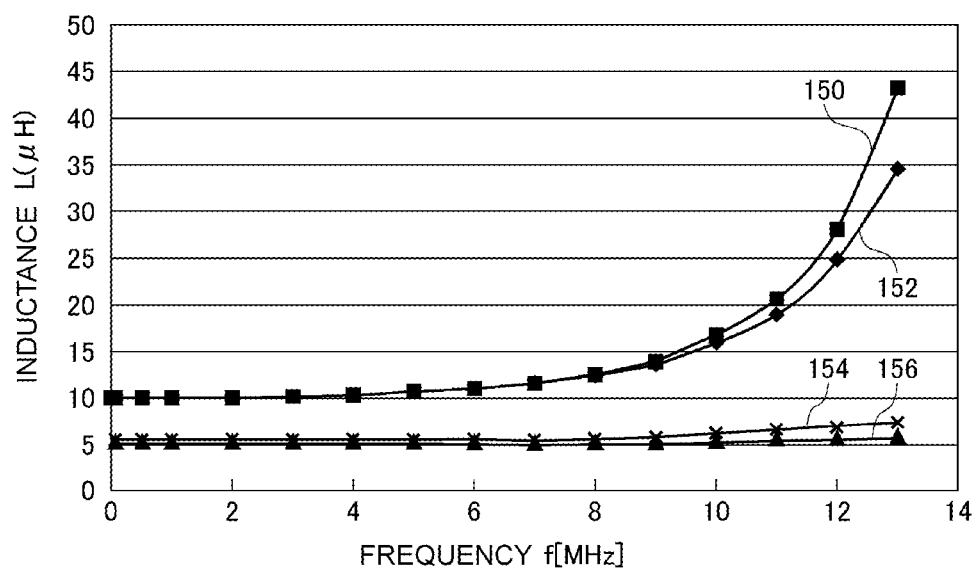
FIG. 6 is a first graph illustrating a relationship between frequency and inductance.

FIG. 6 is a first graph illustrating a relationship between frequency and inductance. The horizontal axis represents frequency (MHz), and vertical axis represents inductance (μH). In the graph of FIG. 6, a Litz wire (obtained by twisting 252 wires each having a diameter of 0.08 mm) is used to create a coil whose number of windings is 5 and whose outer shape is a square of 140 mm×140 mm, and a relationship between the frequency of AC current flowing in the coil and the inductance of the coil is illustrated. The substrate 114 is an acrylic substrate having a thickness of 3.0 mm.

A double-sided/close winding characteristic 150 represents frequency characteristics of a double-sided substrate type/close winding coil. A single-sided/close winding characteristic 152 represents frequency characteristics of a single-sided substrate type/close winding coil. A double-sided/spacer winding characteristic 154 represents frequency characteristics of a double-sided substrate type/spacer winding coil. A single-sided/spacer winding characteristic 156 represents frequency characteristics of a single-sided substrate type/spacer winding coil.

As illustrated in FIG. 6, the inductances of the close winding coils significantly change in a high frequency band. On the other hand, the inductances of both the double-sided substrate type and single-sided substrate type spacer winding coils are stable. The reason for this may be that the influence of the stray capacitance between the coil conductors easily becomes obvious in a high-frequency band in the case of the close winding. Thus, the spacer winding is superior to the close winding in terms of the frequency characteristics.

Further, when comparing the double-sided substrate type/close winding and single-sided substrate type/close winding with each other, the inductance of the double-sided substrate type is more easily changed especially in a high-frequency band. The single-sided substrate type/close winding coil can be brought into a state close to the double-sided substrate type when an object such as a wall is located near the coil conductor, so that the resonance characteristics thereof are further degraded. Although a change in the inductance is larger in the double-sided substrate type than in the single-sided substrate type in the case of the spacer winding, the difference is insignificant as compared to the close winding. The spacer winding is superior also in terms of the point that a change in the inductance caused due to a difference in the substrate type is insignificant.

Figure 7:
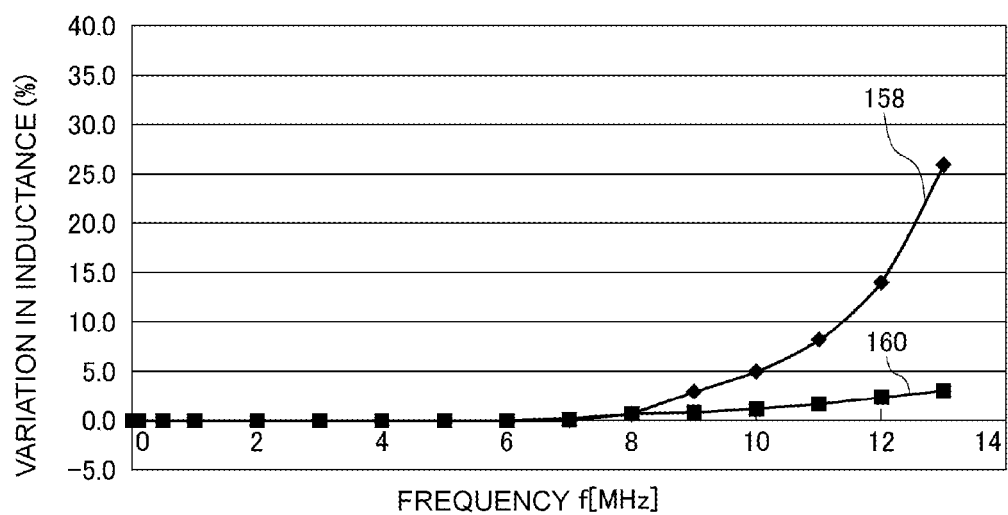
FIG. 7 is a second graph illustrating a relationship between frequency and inductance.

FIG. 7 is a second graph illustrating a relationship between frequency and inductance. The horizontal axis represents frequency (MHz), and vertical axis represents a variation (%) in the inductance. A close winding characteristic 158 represents, based on the result of FIG. 6, a ratio between the inductance of the double-sided substrate type/close winding coil and inductance of the single-sided substrate type/close winding coil in the same frequency as "variation". A spacer winding characteristic 160 represents, based on the result of FIG. 6, a ratio between the inductance of the double-sided substrate type/spacer winding coil and inductance of the single-sided substrate type/spacer winding coil in the same frequency. The variation in a high-frequency band is larger in the close winding characteristic 158 than in the spacer winding characteristic 160. That is, a deviation between the double-sided substrate type and single-sided substrate type is more increased in case of close winding coil.

From above, it can be said that the spacer winding is superior to the close winding in terms of the frequency characteristics. When the coil is made to resonate at a high frequency band, the number of windings of the coil need not be increased, so that the spacer winding is easily adopted. On the other hand, when the coil is made to resonate at a low frequency band, the number of windings of the coil needs to be increased in order to increase the inductance. However, in the case of the spacer winding, when the number of windings is increased, the coil size tends to increase. Even if the close winding is adopted, in case the number of windings is increased, the coil size is inevitably increased. Thus, in this embodiment, the feeding coil L2 and receiving coil L3 each adopt a winding structure capable of sufficiently increasing the number of windings while suppressing the coil size.

Figure 8:
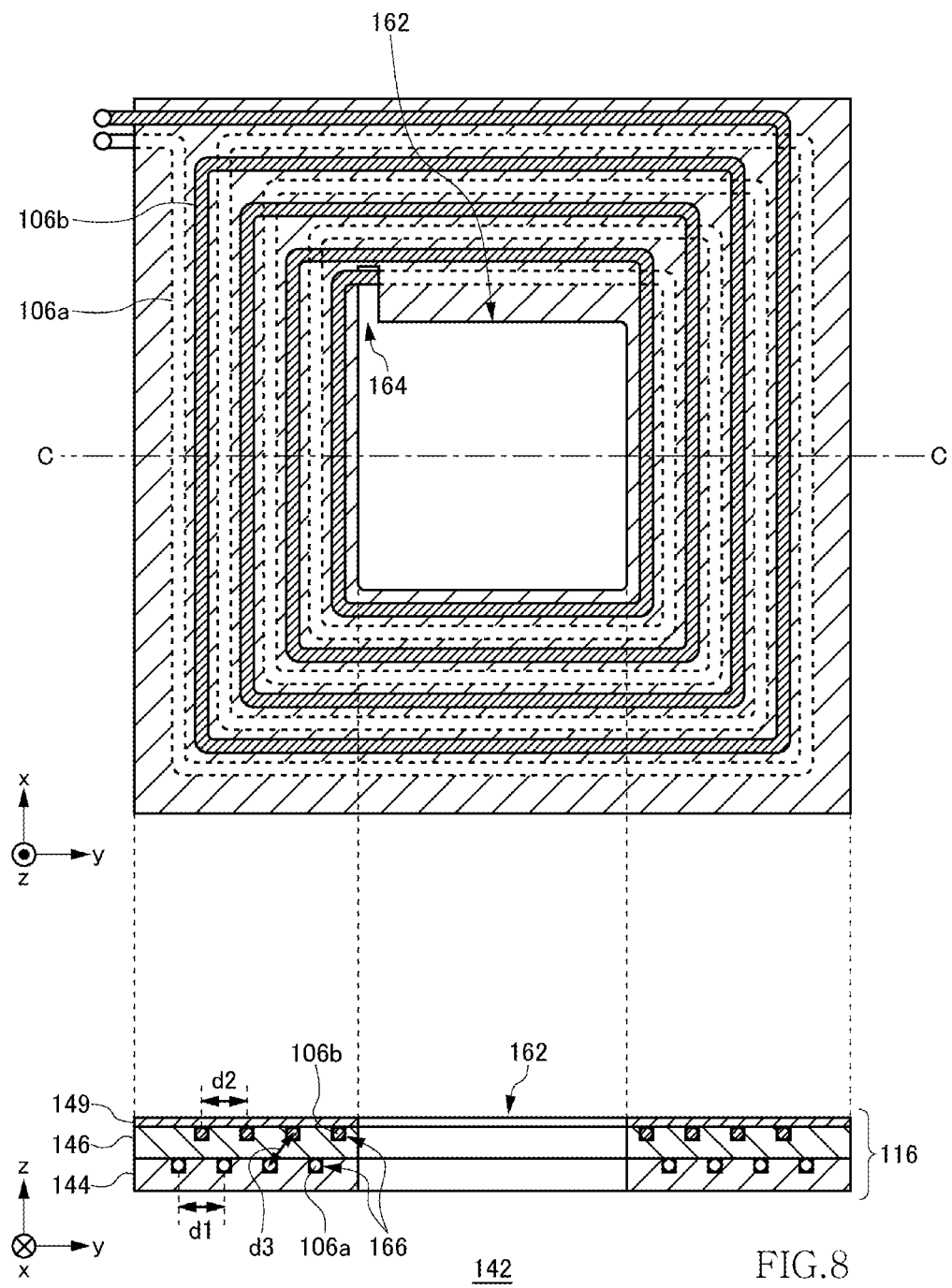
FIG. 8 is a development view of a feeding package.

FIG. 8 is a development view of a feeding package 142. The upper side of FIG. 8 is an xy plane view of the feeding package 142, and the lower side thereof is a side cross-sectional view (yz plane) taken along C-C line. The feeding package 142 has a configuration in which the feeding coil L2 is encapsulated in a multilayer resin substrate 116. Note that the receiving coil L3 is encapsulated in another multilayer substrate 116 so as to form a receiving package (not illustrated). The winding structures of the feeding coil L2 in the feeding package 142 and receiving coil L3 in the receiving package are basically the same, so that only the winding structure of the feeding package 142 will be described below.

The multilayer substrate 116 is obtained by laminating two substrates: a first layer substrate 144 and a second layer substrate 146 and further laminating a cover 149 on the laminated two substrates. The first layer substrate 144, second layer substrate 146, and cover 149 are each a square-shaped resin substrate and each have a square hollow portion 162 in the center thereof. Thus, the multilayer substrate 116 has a ring shape. A cut portion 164 is formed in apart of the hollow portion 162 in the first layer substrate 144 and second layer substrate 146.

The feeding package 142 is produced according to the following process. A spiral groove 166 is previously formed both in the first layer substrate 144 and second layer substrate 146. Then, a coil conductor 106a (part of the coil conductor 106) is wound along the groove 166 formed in the first layer substrate 144. When the coil conductor 106a is wound in this manner, the spacer winding coil is formed in the first layer substrate 144. The entire coil conductor 106a is accommodated within the first layer substrate 144. A distance d1 between the adjacent grooves 166 formed in the first layer substrate 144 is larger, at least, than the diameter of the coil conductor 106a. Therefore, the stray capacitance occurring between the adjacent coil conductors 106a in the first layer substrate 144 becomes sufficiently small.

After the winding of the coil conductor 106a, a coil conductor 106b (residual part of the coil conductor 106) is drawn out through the cut portion 164. Then, the second layer substrate 146 is bonded onto the first layer substrate 144 accommodating the coil conductor 106a. As a result, the coil conductor 106a is stably fixed within the first layer substrate 144.

The spacer winding coil is formed also in the second layer substrate 146. The entire coil conductor 106b is accommodated within the second layer substrate 146. Also in the second layer substrate 146, a distance d2 between the adjacent grooves 166 is larger, at least, than the diameters (width of the groove 166) of the coil conductors 106a and 106b. Therefore, the stray capacitance occurring between the adjacent coil conductors 106b in the second layer substrate 146 becomes sufficiently small.

After the winding of the coil conductor 106b, the cover 149 is bonded onto the second layer substrate 146 accommodating the coil conductor 106b. As a result, the coil conductor 106b is stably fixed within the second layer substrate 146. Only end points of the coil conductors 106a and 106b are drawn out from the feeding package 142, and a double spacer winding coil is formed inside the feeding package 142. With this winding structure, it is possible to increase the number of windings while suppressing both the stray capacitance occurring between the coil conductors 106 and coil size. In the case of the winding structure illustrated in FIG. 8, the total number of windings is 8 (4 in the first layer substrate 144 and 4 in the second layer substrate 146).

As viewed in the axial direction (z-axis direction) of the feeding coil L2, the coil conductor 106a in the first layer substrate 144 is disposed between the adjacent two coil conductor 106b in the second layer substrate 146 (refer to the xy plane view of FIG. 8). That is, as viewed from in the z-axis direction, the coil conductor 106a in the first layer substrate 144 and coil conductor 106b in the second layer substrate 146 are alternately arranged in parallel. As a result, a distance d3 between the coil conductor 106a and coil conductor 106b, the stray capacitance (hereinafter, "thickness stray capacitance") occurring between the coil conductor 106a and coil conductor 106b can be suppressed. When a resin having a low dielectric constant is used as a material of the multilayer substrate 116, this effect can be enhanced further. As a modification, the coil conductor 106a may be accommodated not on the bonding surface side of the second layer substrate 146 and first layer substrate 144 but on the side opposite to the boding surface. In this case, the distance d3 can be increased further.

Figure 9:
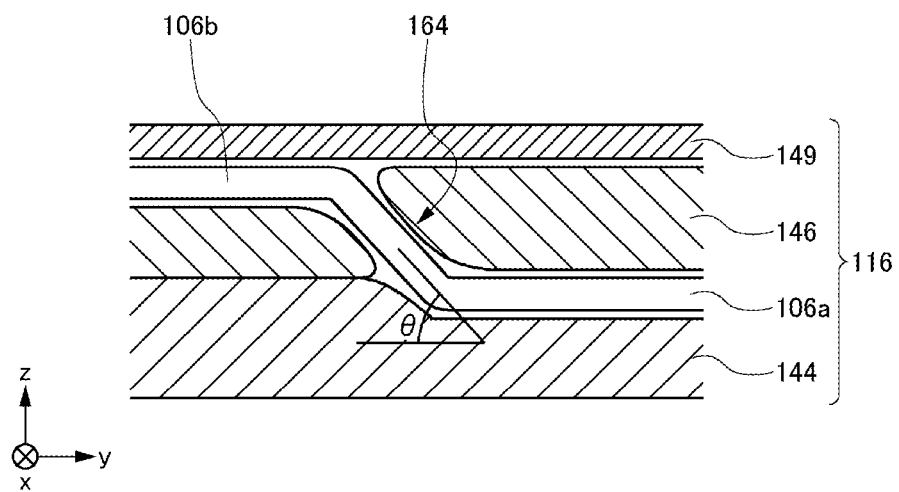
FIG. 9 is a side cross-sectional view of a multilayer substrate in which an area around a cut portion is enlarged.

FIG. 9 is a side cross-sectional view of the multilayer substrate 116, in which an area around the cut portion 164 is enlarged. The coil conductor 106a enters the groove 166 of the second layer substrate 146 through the cut portion 164. The coil conductor 106 is gently bent so as to prevent the characteristics of the coil conductor 106 from significantly changing around the cut portion 164. It is desirable that the inclination angle θ of the cut portion with respect to the xz plane is 45° or less.

Figure 10:
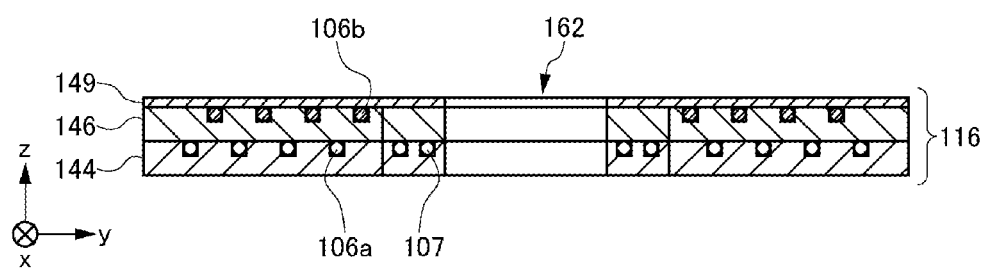
FIG. 10 is a side cross-sectional view of a multilayer substrate that can accommodate an exciting coil.

FIG. 10 is a side cross-sectional view of the multilayer substrate 116 that can accommodate the exciting coil L1. Not only the feeding coil L2 but also the exciting coil L1 may be accommodated within the feeding package 142. As illustrated in FIG. 10, a coil conductor 107 of the exciting coil L1 may be wound inside the feeding coil L2. The exciting coil L1 can be closely wound unless the resonance characteristics are adversely affected. Further, the exciting coil L1 may be wound in any one of the first layer substrate 144 and second layer substrate 146, or may be wound both in the first layer substrate 144 and second layer substrate 146 as in the case of the feeding coil L2.

Figure 11:
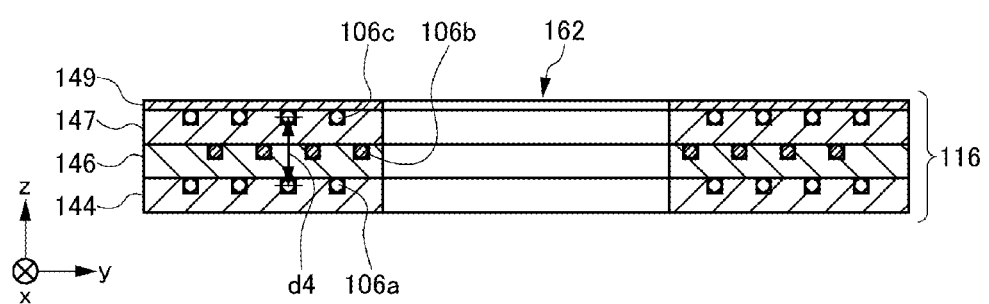
FIG. 11 is a side cross-sectional view of a multilayer substrate having a three-layer structure.

FIG. 11 is a side cross-sectional view of the multilayer substrate 116 having a three-layer structure. In the multilayer substrate 116 of FIG. 11, a third layer substrate 147 is laminated on the first layer substrate 144 and second layer substrate 146. The cut portion 164 is formed not only between the first layer substrate 144 and second layer substrate 146, but also between the second layer substrate 146 and third layer substrate 147. The coil conductor 106a is spacer wound in the first layer substrate 144, the coil conductor 106b is spacer wound in the second layer substrate 146, and the residual coil conductor 106c is spacer wound in the third layer substrate 147.

As viewed in z-axis direction, the coil conductor 106c in the third layer substrate 147 is disposed between the adjacent coil conductors 106b in the second layer substrate 146. Further, as viewed in z-axis direction, the coil conductor 106c in the third layer substrate 147 is positioned just above the coil conductor 106a in the first layer substrate 144. The second layer substrate 146 exists between the first layer substrate 144 and third layer substrate 147, so that even when the coil conductor 106c is disposed just above the coil conductor 106a, a distance d4 between the coil conductor 106a and coil conductor 106c can be made sufficiently large. Thus, the thickness stray capacitance occurring between the coil conductor 106a and coil conductor 106c becomes sufficiently small.

Figure 12:
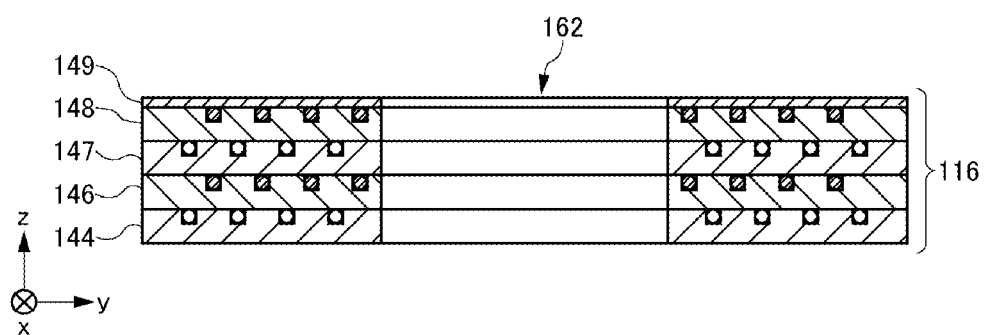
FIG. 12 is a side cross-sectional view of a multilayer substrate having a four-layer structure.

FIG. 12 is a side cross-sectional view of the multilayer substrate 116 having a four-layer structure. In the multilayer substrate 116 of FIG. 12, a fourth layer substrate 148 is laminated between the third layer substrate 147 and cover 149. The cut portion 164 is also formed between the third layer substrate 147 and fourth layer substrate 148. The larger the number of layers of the substrates, the larger can be the number of windings in the multilayer substrate 116. Experiments made by the present inventor has revealed that when the feeding coil L2 having a three-layer structure in which the number of windings is 6 per one layer is made to resonate in series with the capacitor C2 having an electrostatic capacitance of 0.1 (μF), an inductance of 101 (μH) and resonance frequency fr1 of 50 kHz are obtained.

Figure 13:
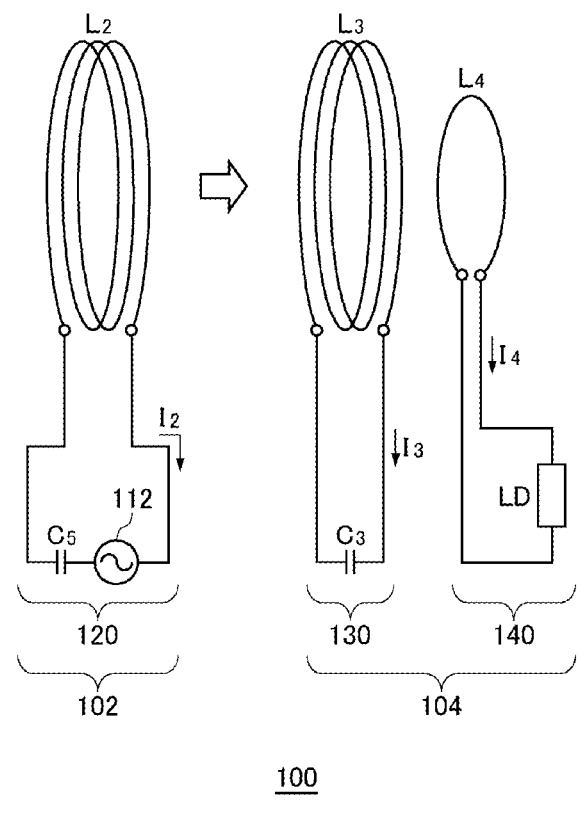
FIG. 13 is another example of a system configuration view of the wireless power transmission system.

FIG. 13 is another example of a system configuration view of the wireless power transmission system 100. While the AC power supply 112 is used to drive the exciting coil L1 in the configuration illustrated in FIG. 2, the AC power supply 112 may be used to directly drive the feeding coil L2 as illustrated in FIG. 13 by making the feeding coil L2 and capacitor C5 resonate with each other. This configuration can eliminate the need to provide the exciting circuit 110, which is advantageous for size reduction of the wireless power feeder 102. The configuration of FIG. 2 in which the exciting coil L1 is used has an advantage that the Q-value of the power feeding side is more easily increased than in the configuration of FIG. 13.

[Second Embodiment]

Figure 14:
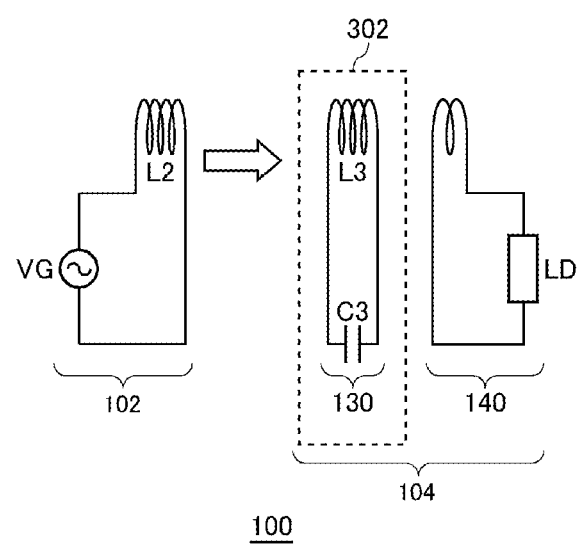
FIG. 14 is a view illustrating operation principle of a wireless power transmission system according to a second embodiment.

FIG. 14 is a view illustrating operation principle of the wireless power transmission system 100 according to a second embodiment. As in the case of the first embodiment, the wireless power transmission system 100 according to the second embodiment includes the wireless power feeder 102 and wireless power receiver 104. However, although the wireless power receiver 104 includes the power receiving LC resonance circuit 302, the wireless power feeder 102 does not include the power feeding LC resonance circuit 300. That is, the feeding coil L2 does not constitute a part of the LC resonance circuit. More specifically, the feeding coil L2 does not form any resonance circuit with other circuit elements included in the wireless power feeder 102. No capacitor is connected in series or in parallel to the feeding coil L2. Thus, the feeding coil L2 does not resonate in a frequency at which power transmission is performed.

The power feeding source VG supplies AC current of the resonance frequency fr1 to the feeding coil L2. The feeding coil L2 does not resonate but generates an AC magnetic field of the resonance frequency fr1. The receiving LC resonance circuit 302 resonates by receiving the AC magnetic field. As a result, large AC current flows in the power receiving LC resonance circuit 302. Studies conducted by the present inventor have revealed that formation of the LC resonance circuit is not essential in the wireless power feeder 102. The feeding coil L2 does not constitute a part of the power feeding LC resonance circuit, so that the wireless power feeder 102 does not resonate at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 102 does not contain the power feeding LC resonance circuit 300, if the wireless power receiver 104 includes the power receiving LC resonance circuit 302, the wireless power feeding of a magnetic field resonance type can be achieved.

Even when the feeding coil L2 and receiving coil L3 are magnetic-field-coupled to each other, a new resonance circuit (new resonance circuit formed by coupling of resonance circuits) is not formed due to absence of the capacitor C2. In this case, the stronger the magnetic field coupling between the feeding coil L2 and receiving coil L3, the greater the influence exerted on the resonance frequency of the power receiving LC resonance circuit 302. By supplying AC current of this resonance frequency, that is, a frequency near the resonance frequency fr1 to the feeding coil L2, the wireless power feeding of a magnetic field resonance type can be achieved. In this configuration, the capacitor C2 need not be provided, which is advantageous in terms of size and cost.

Figure 15:
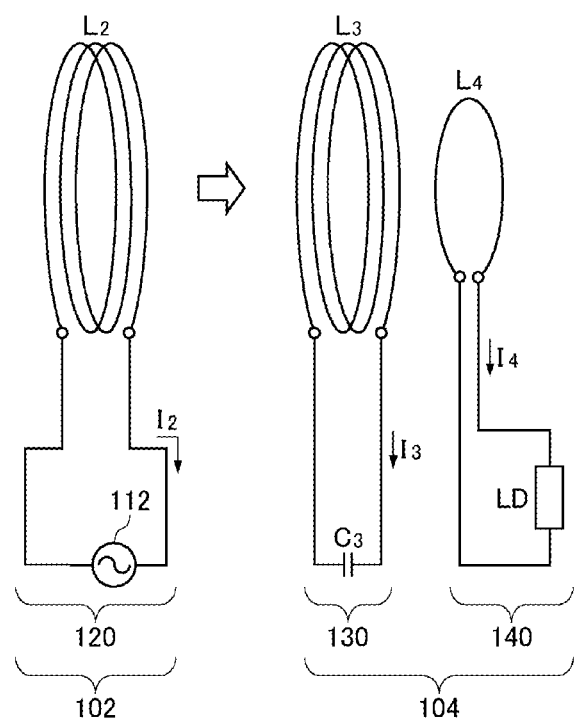
FIG. 15 is a system configuration view of the wireless power transmission system according to the second embodiment.

FIG. 15 is a system configuration view of the wireless power transmission system 100 according to the second embodiment. In the wireless power transmission system 100 of the second embodiment, the capacitor C2 is omitted. Other points are the same as the first embodiment.

The wireless power transmission system 100 has been described based on the preferred embodiments. When a variable capacitor is connected in series to the coil, the resonance frequency can be changed. In order to set the changeable range of the resonance frequency at a low-frequency band, the coil inductance or electrostatic capacitance of the variable capacitor needs to be increased. However, at present, a small-sized, large-capacity, and variable capacitor is impractical. In order to reduce the resonance frequency and reduce the electrostatic capacitance of the variable capacitor, a coil having a large inductance and a reduced size is required.

According to the present embodiment, it is possible to increase the number of windings while suppressing the plane size of the feeding coil L2 and receiving coil L3. The spacer winding in which the inductance is hardly likely to be changed depending on the frequency band used is allowed to be adopted, making it easy to eliminate the influence of the stray capacitance. Further, the coil conductors in the adjacent substrates are alternately arranged in parallel as viewed in z-axis direction so as to suppress the thickness stray capacitance.

The groove 166 for accommodating the coil conductor 106 is previously formed in each substrate, so that it is possible to easily and stably wound the coil conductor 106. Further, the coil conductor 106 can be accommodated completely within the multilayer substrate 116, which is advantageous for suppressing external influence on the coil conductor 106.

In the technique disclosed in Patent Document 5, one-layer/spacer winding coil structure is adopted, so that the coil plane size is increased in the case where the resonance frequency is set at a low frequency band. In the case where the receiving coil L3 is mounted in a small device such as a mobile phone, it is likely that a sufficient inductance cannot be ensured. On the other hand, according to the coil structure of the present embodiment, a large inductance can be achieved while suppressing the coil size.

While the number of windings is increased for the purpose of increasing the inductance in a low-frequency band in the present embodiment, there may be a case where the number of windings needs to be increased for the purpose of increasing the inductance in an intermediate-frequency band not higher than 10 MHz or higher-frequency band. Further, for example, when the receiving coil is mounted in a small device, there may be a case where the number of windings needs to be increased instead of reducing the coil area. Also in this case, according to the winding structure described using FIG. 8, it is possible to suppress the coil area while maintaining satisfactory frequency characteristics achieved by the spacer winding structure.

The present invention has been described based on the above embodiments. It should be understood by those skilled in the art that the above embodiments are merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

The "AC power" used in the wireless power transmission system 100 may be transmitted not only as an energy but also as a signal. Even in the case where an analog signal or digital signal is fed by wireless, the wireless power transmission method of the present invention may be used.

What is claimed is:
1. A wireless power feeder that wirelessly feeds power from a feeding coil to a receiving coil using a magnetic field resonance phenomenon between the feeding coil and the receiving coil, the feeder comprising:
a feeding coil circuit that includes the feeding coil;
a power supply circuit that supplies AC power to the feeding coil; and
a feeding package including a first substrate and a second substrate disposed on the first substrate for accommodating a coil conductor of the feeding coil, wherein
the coil conductor of the feeding coil is wound into a series of loops for the first substrate and into another series of loops for the second substrate, each loop being separated from each other, and the coil conductor in the first substrate and the coil conductor in the second substrate being alternately arranged as viewed in an axial direction of the feeding coil,
the feeding package includes a cut portion through which the coil conductor runs from the first substrate to the second substrate disposed on the first substrate,
the coil conductor in the cut portion is inclined at 45 degrees or less with respect to the first substrate, and
the coil conductor comprises only a seamless single conductor running from the first substrate to the second substrate through the cut portion.

2. The wireless power feeder according to claim 1, wherein the feeding coil is wound on the first and second substrates, and
at least one of the first and second substrates has a groove for accommodating the coil conductor of the feeding coil.

3. The wireless power feeder according to claim 1, wherein a hollow portion is formed in a center portion of the feeding package and the cut portion is formed in a part of the hollow portion.

4. The wireless power feeder according to claim 1, wherein a space between the loops of the coil conductor is greater a diameter of the feeding coil.

5. The wireless power feeder according to claim 1, further comprising an exciting circuit including an exciting coil magnetically coupled to the feeding coil, wherein
the exciting circuit supplies the AC power supplied from the power supply circuit from the exciting coil to the feeding coil, and
the exciting coil is wound inside the feeding coil.

6. The wireless power feeder according to claim 1, wherein the power supply circuit causes the feeding coil to which no capacitor is connected in series or in parallel, to feed the AC power to the receiving coil.

7. The wireless power feeder according to claim 1, wherein the feeding coil does not form, together with circuit elements on the power feeding side, a resonance circuit having a resonance point corresponding to the resonance frequency of the receiving coil.

8. The wireless power feeder according to claim 1, wherein no capacitor is connected in series or in parallel to the feeding coil.

9. The wireless power feeder according to claim 1, wherein the feeding coil circuit is a circuit that resonates at the resonance frequency of the receiving coil.

10. The wireless power feeder according to claim 1, wherein the coil conductor is a Litz wire.

11. A wireless power receiver that receives, at a receiving coil, AC power wirelessly fed from a feeding coil using a magnetic field resonance phenomenon between the feeding coil and the receiving coil, the receiver comprising:

a receiving coil circuit that includes a receiving coil and a capacitor;
a loading circuit that includes a loading coil that is magnetically coupled to the receiving coil to receive the AC power from the receiving coil and supply the AC power to a load; and
a receiving package including a first substrate and a second substrate disposed on the first substrate for accommodating a coil conductor of the receiving coil, wherein
the coil conductor of the receiving coil is wound into a series of loops for the first substrate and into another series of loops for the second substrate, each loop being separated from each other, and the coil conductor in the first substrate and the coil conductor in the second substrate being alternately arranged as viewed in an axial direction of the receiving coil,
a receiving package includes a cut portion through which the coil conductor runs from the first substrate to the second substrate disposed on the first substrate,
the coil conductor in the cut portion is inclined at 45 degrees or less with respect to the first substrate, and
the coil conductor comprises only a seamless single conductor running from the first substrate to the second substrate through the cut portion.

12. The wireless power receiver according to claim 11, wherein
the receiving coil is wound on the first and second substrates, and
at least one of the first and second substrates has a groove for accommodating the coil conductor of the receiving coil.

13. The wireless power receiver according to claim 11, wherein a hollow portion is formed in a center portion of the receiving package and the cut portion is formed in a part of the hollow portion.

14. The wireless power receiver according to claim 11, wherein the receiving coil circuit is a circuit that resonates at the resonance frequency of the feeding coil circuit.

15. The wireless power receiver according to claim 11, wherein the coil conductor is a Litz wire.

16. A wireless power transmission system for wirelessly feeding power from a feeding coil to a receiving coil using a magnetic field resonance phenomenon between the feeding coil and the receiving coil, the system comprising:
a power supply circuit that supplies AC power to the feeding coil;
a feeding coil circuit that includes the feeding coil;
a receiving coil circuit that includes a receiving coil and a capacitor;
a loading circuit that includes a loading coil that is magnetically coupled to the receiving coil to receive the AC power from the receiving coil and supply the AC power to a load; and
a first coil package including a first substrate and a second substrate disposed on the first substrate for accommodating a coil conductor of one of the feeding coil and the receiving coil, wherein
the coil conductor of the one of the feeding coil and the receiving coil is wound into a series of loops for the first substrate and into another series of loops for the second substrate, each loop being separated from each other, and the coil conductor in the first substrate and the coil conductor in the second substrate being alternately arranged as viewed in a power feeding direction,
the first coil package includes a cut portion through which the coil conductor of the one of the feeding coil and the receiving coil runs from the first substrate to the second substrate disposed on the first substrate, the coil conductor in the cut portion of the first coil package is inclined at 45 degrees or less with respect to the first substrate, and the coil conductor of the one of the feeding coil and the receiving coil comprises only a seamless single conductor running from the first substrate to the second substrate through the cut portion.

17. The wireless power transmission system according to claim 16, further comprising a second coil package including a first substrate and a second substrate disposed on the first substrate for accommodating a coil conductor of the other of the feeding coil and the receiving coil, wherein a coil conductor of the other of the feeding coil and the receiving coil is wound into a series of loops for the first substrate and into another series of loops for the second substrate, each loop being separated from each other, and the coil conductor in the first substrate and the coil conductor in the second substrate being alternately arranged as viewed in the power feeding direction, the second coil package includes a cut portion through which the coil conductor of the other of the feeding coil and the receiving coil runs from the first substrate to the second substrate disposed on the first substrate, the coil conductor in the cut portion of the second coil package is inclined at 45 degrees or less with respect to the first substrate, and the coil conductor of the other of the feeding coil and the receiving coil comprises only a seamless single conductor running from the first substrate to the second substrate through the cut portion.

18. The wireless power transmission system according to claim 16, wherein the coil conductor is a Litz wire.

* * * * *